Dec. 4, 1956     D. G. RENNO     2,772,915
WINDOW ASSEMBLY FOR VEHICLE BODIES
Filed June 1, 1954     3 Sheets-Sheet 1
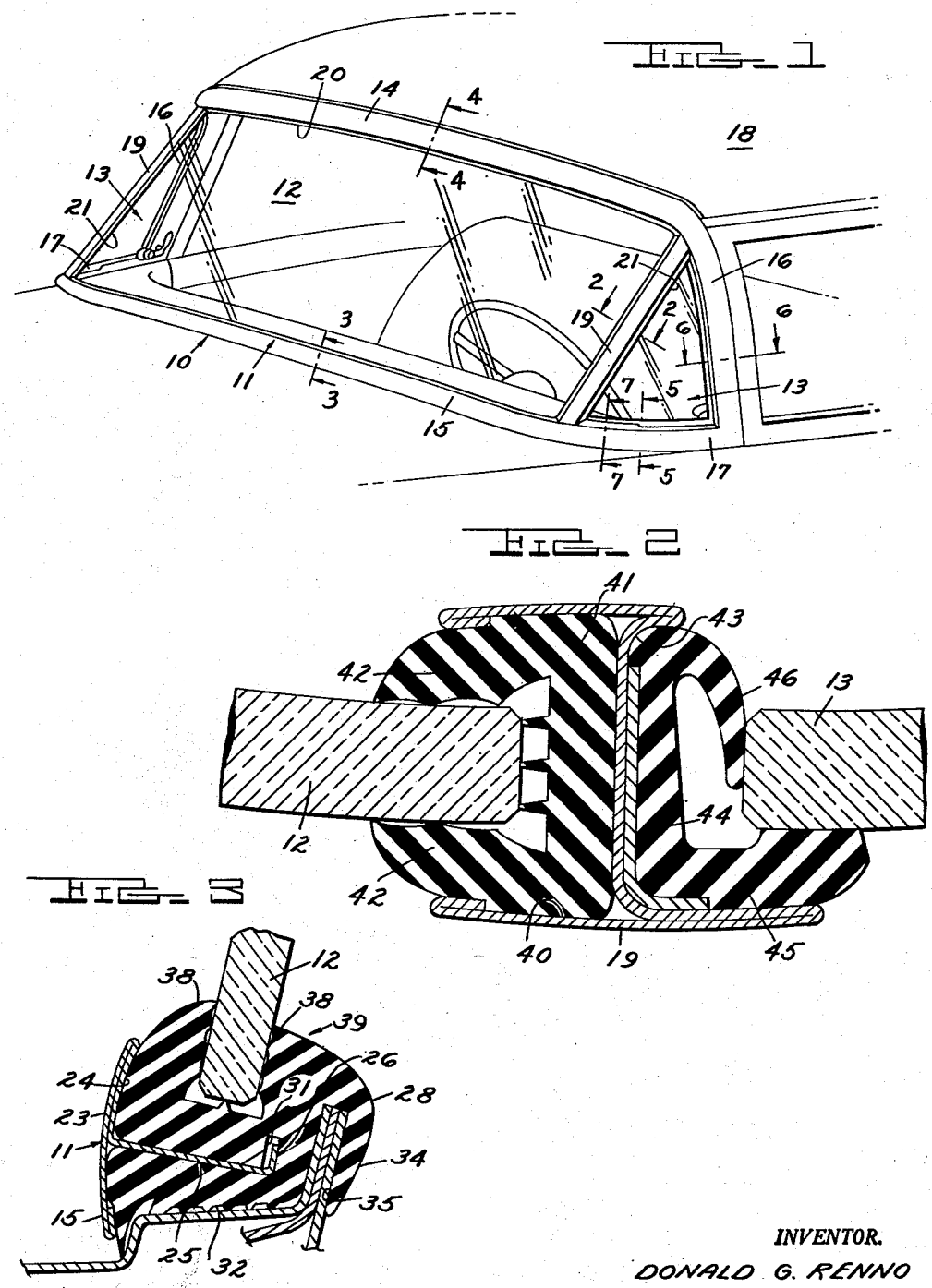
INVENTOR.
DONALD G. RENNO
BY
ATTORNEYS

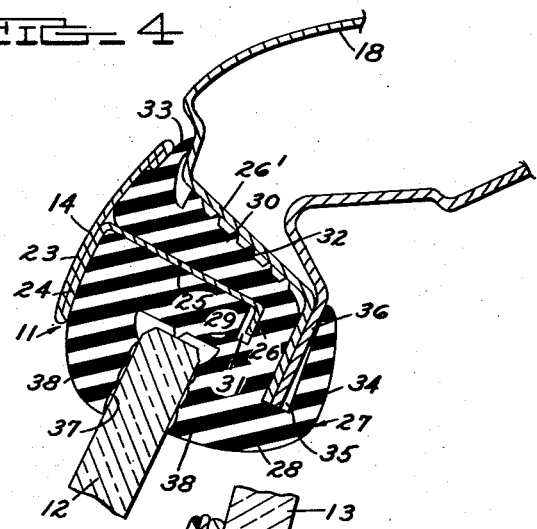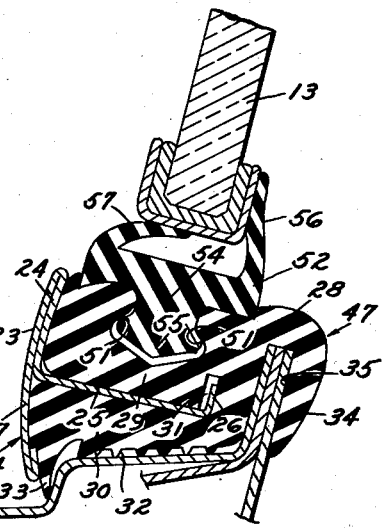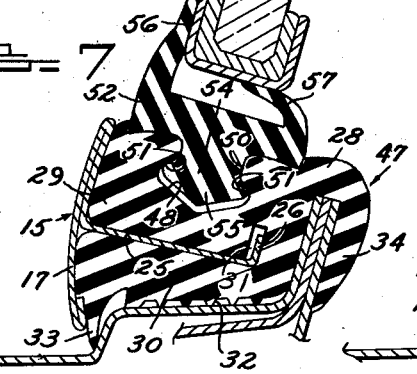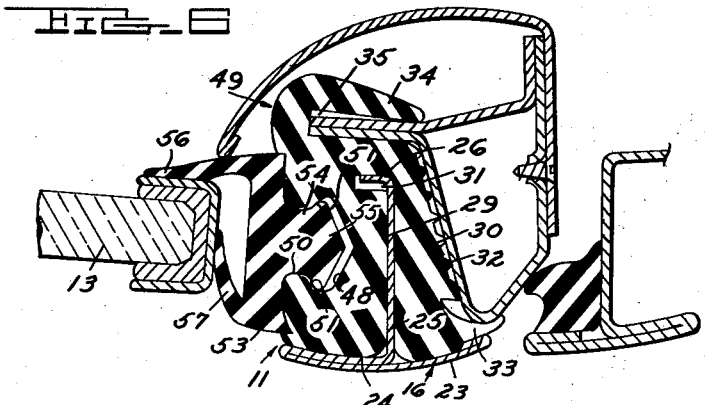

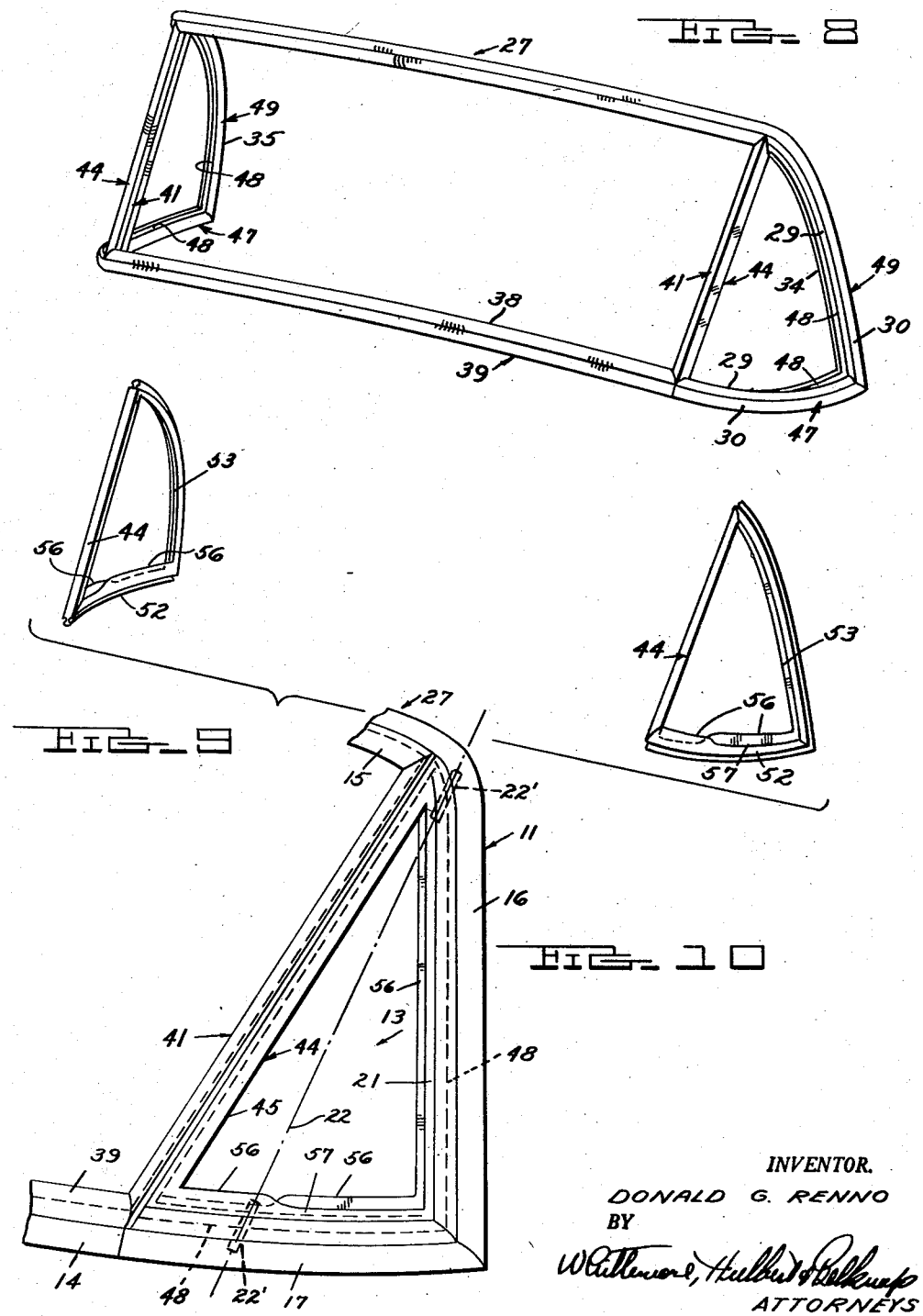

United States Patent Office 2,772,915
Patented Dec. 4, 1956

2,772,915

WINDOW ASSEMBLY FOR VEHICLE BODIES

Donald G. Renno, Birmingham, Mich., assignor to Motor Products Corporation, Detroit, Mich., a corporation of New York Application June 1, 1954, Serial No. 433,421

10 Claims. (Cl. 296—84)

This invention relates geenrally to window assemblies for installation in vehicle bodies and refers more particularly to improvements in windshield or back light window assemblies of the so-called "wrap-around" type. The invention deals with improvements in structure of this type such as is shown and described in my prior co-pending application, Serial No. 422,409, filed April 12, 1954, now Patent 2,761,729.

Still more particularly, the invention concerns itself with a vehicle body window assembly comprising a frame structure having a main window opening for a fixed transparent panel and having ventilator window openings at opposite ends of the main window opening for respectively receiving ventilator panels mounted on the frame structure for swinging movement about upwardly extending axes.

It is an object of the present invention to provide improved weathersealing means for both the frame structure and the panels supported thereby.

The foregoing as well as other objects will be made more apparent as this description proceeds especially when considered in connection with the accompanying drawings, wherein:

Figure 1 is a fragmentary perspective view of the front end portion of a vehicle body equipped with a window assembly embodying the features of this invention;

Figures 2, 3, 4, 5, 6, and 7 are respectively sectional views taken on the lines 2—2, 3—3, 4—4, 5—5, 6—6 and 7—7 of Figure 1;

Figure 8 is a perspective view of the weatherstripping embodied in the window assembly shown in Figure 1;

Figure 9 is a perspective view showing the weatherstripping for the respective ventilator windows; and Figure 10 is a fragmentary elevational view of the frame assembly shown in Figure 1.

The window assembly forming the subject matter of this invention may be installed at either or both ends of a vehicle body to form either or both the windshield and back light of the vehicle body. For the purpose of illustration, the window assembly is shown as installed on a vehicle body at the front of the latter to provide both the windshield and the ventilator windows at opposite sides of the body.

In detail, the numeral 10 designates a window assembly comprising a frame 11, a main or fixed window panel 12, and ventilator panels 13 respectively positioned at opposite ends of the fixed window panel 12. Briefly, the frame 11 is formed of sheet metal sections or bars rolled or otherwise fashioned to the desired contour. More particularly, the frame 11 comprises a top bar 14, a bottom bar 15, and end bars 16.

The bottom bar 15 of the frame 11 is offset in a forward direction from the top bar 14 and the opposite ends 17 of the bottom bar 15 are curved in a rearward direction to respectively extend along opposite sides of the vehicle body which is indicated in Figure 1 of the drawings by the numeral 18. The end bars 16 form in effect continuations of opposite ends of the top frame bar 14 and are connected to the extremities of the end portions 17 of the bottom frame bar 15.

Suitable division bars or members 19 serve to divide the space defined by the frame 11 into a main window opening 20 for the panel 12 and into ventilating window openings 21 for the panels 13. The upper ends of the division bars 19 are respectively integrally joined to the frame 11 at the junctions between the upper ends of the end bars 16 and the opposite ends of the top bar 14. The lower ends of the division bars 19 are respectively integrally connected to the frame 11 at the junctions between the end portions 17 and the bottom bar 15. The manner in which the ventilator panels 13 are mounted on the frame 11 forms no part of the present invention and, hence, these mountings are not shown in detail herein. It will suffice to point out that the ventilator panels 13 are respectively supported on the frame 11 within the openings 21 for swinging movement about pivots 22' on upwardly extending axes indicated in Figure 10 of the drawings by the numeral 22.

As shown in Figures 3–7 inclusive of the drawings, the drawings, the frame bars are of the same cross sectional contour. In detail, the frame bars have body portions 23 extending continuously around the frame 11 at the front side of the latter and of sufficient width to serve as a finish molding. The inner marginal portions of the body 23 are return bent to provide flanges 24 in surface to surface relation with the rear sides of the body portions 23, and the flanges 24 are turned laterally inwardly to provide attaching flanges 25. The attaching flanges 25 are positioned intermediate the opposite edges of the body portions 11 and are turned inwardly at the free ends thereof to form reinforcing flanges 26. The flanges 25 on the respective frame bars extend continuously around the frame 11 and serve to anchor weatherstripping in place in a manner to be more fully hereinafter described.

In order to effectively seal the space between the top bar 14 of the frame 11 and the adjacent body structure 26', a weatherstrip 27 of resilient material extends along the top bar 14 between the division bars 19. The weatherstrip 27 comprises a body portion 28 having a first or outer part 30 and a second or inner part 29 projecting therefrom in overlying relationship. The parts 29 and 30 are normally held under tension in contact with one another and are separable to receive therebetween the flange 25 on the frame bar 14. A slot or clearance opening 31 is formed at the juncture of the inner part 29 with the body 28 to accommodate the flange 26 at the extremity of the flange 25.

The front sides of the parts 29 and 30 have a sealing contact with the rear surface of the frame bar 14 at opposite sides of the flange 25 and the outer part 30 has the outer surface serrated to provide laterally spaced projections 32 which have a sealing contact with the adjacent surface of the supporting structure 26'. Also, the outer part 30 is fashioned with a lip 33 which projects outwardly from the part 30 at the front side of the latter to engage the body supporting structure 26' above the frame bar 14.

The body portion 28 of the weatherstrip 27 has an outwardly extending lip 34 at the rear side thereof and this lip cooperates with the body portion 28 to form an upwardly opening slot 35. The slot 35 receives a downwardly extending projection or flange 36 on the body supporting structure 26' and serves as an additional weathersealing area between the frame 11 and the body structure 26'. In addition, the body portion 28 is fashioned with an inwardly opening channel 37 forming lips 38 which cooperate to grip the adjacent edge of the fixed glass panel 12.

The length of weatherstripping extending along the bottom frame bar 15 between the lower ends of the division bars 19 is indicated in Figure 3 by the numeral 39. This first bottom weatherstrip 39 is practically identical to the weatherstrip 27 and the same reference numerals are used to designate corresponding parts. The lip portions 38 of the weatherstrip 39 grip the lower edge of the glass panel 12 and assist the lip portions 38 of the weatherstrip 27 to secure the panel 12 to the frame 11.

As shown in Figure 2 of the drawings, the division bars 19 have channel portions 40 which open inwardly with respect to the window opening 20 and respectively retain weatherstrips 41. The weatherstrips 41 have flexible lips 42 which cooperate to grip opposite ends of the panel 12 and hence cooperate with the weatherstrips 27 and 39 to securely but resiliently fasten the panel 12 in assembled relationship with the frame 11. The division bars 19 are also fashioned to provide channels 43 which open into the respective ventilating openings 21 and serve as retainers for weatherstrips 44.

The weatherstrips 44 have lips 45 positioned for engagement by the outer surfaces of the ventilator panels 13 adjacent the front edges of the latter when said panels are in their respective closed positions, and have highly flexible lips 46 projecting into the paths of swinging movement of the front edges of the ventilator panels 13 for engagement by the latter edges when the panels 13 are swung to their closed positions. The opposite ends of the weatherstrips 41 and 44 are respectively cemented, vulcanized or otherwise secured to the weatherstrips 27 and 39, as shown in Figure 8 of the drawings to provide, in effect, an integral unit.

The space between the end portions 17 of the bottom frame bar 15 and the adjacent body structure is sealed by weatherstrips 47, as shown in Figures 5 and 7 of the drawings. The weatherstrips 47 are identical in cross section to the weatherstrips 27, 39 with the exception that the inner parts of the body portions are respectively fashioned with inwardly opening recesses 48 extending lengthwise of the weatherstrips. Thus, the same reference numerals are also used to designate the parts of the weatherstrips 47 which correspond to the weatherstrips 27 and 39. The front ends of the body portions 28 and the front ends of the outer parts 30 of the weatherstrips 47 are cemented, vulcanized or otherwise integrally joined to the adjacent ends of the body portion 28 and outer part 30 of the weatherstrip 39 at the zone of connection of the weatherstrips 41 and 44 with the weatherstrip 39.

The space between the end frame bars 16 and the adjacent body structure is weathersealed by strips 49 shown in Figure 6 of the drawings. The strips 49 are identical in cross section to the strips 47 and the same reference characters are used to designate corresponding parts. The lower ends of the respective weatherstrips 49 are cemented, vulcanized or otherwise joined to the rear ends of the weatherstrips 47 to form a continuation of the latter. The upper ends of the body portions 28 and the upper ends of the outer parts 30 of the weatherstrips 49 are, respectively, integrally joined to the adjacent ends of the body portion 28 and outerpart 30 of the weatherstrip 27 at the points of connection of the upper ends of the weatherstrips 41 and 44 to the weatherstrip 27, as shown in Figure 8 of the drawings.

The grooves 48 in the weatherstrips 47 and 49 are fashioned to provide entrant openings or slots 50 of reduced width. As a result, shoulders 51 are provided at opposite sides of the slots 50 within the grooves 48. The purpose of the grooves 48 is to permit attaching second weatherstrips 52 and 53 to the respective weatherstrips 47 and 49. The strips 52 and 53 are generally channel-shaped in cross section and respectively extend for the full lengths of the strips 47 and 49. The base portion of each strip 52, 53 has an outwardly projecting rib 54 extending for the full length of the base portion and having a width slightly greater than the width of the entrant slots 50 to the recesses 48. Each rib 54 has an enlargement or head 55 at the outer edge of substantially greater width than the entrant slots 50 to the recesses 48 but of a dimension to fit within the recesses 48 beyond the shoulders 51.

The above arrangement is such that the heads 55 may be forcibly inserted into the respective grooves 48 through the relatively narrow slots 50 and when installed within the grooves 48 cooperate with the shoulders 51 to provide a weather-tight interlocking connection between the weatherstrips 52, 53 and the strips 47, 49, respectively. The side walls of the channel-shaped strips 52 and 53, respectively, form lips 56 and 57 engageable with the ventilator panels 13 in the closed positions of the latter to provide an effective weatherseal around the bottom and rear edges of the panels.

The lips 56, although flexible, are relatively stiff and serve as stops to locate the ventilator panels 12 in their closed positions. The lips 57 project into the path of swinging movement of the panels 13 and are sufficiently flexible to be deflected from their normal positions by panels 13 as the latter are swung to their closed positions. The lips 57 when in their deflected positions are held under tension against the adjacent edges of the ventilator panels 13 to assure obtaining a highly effective weatherseal. It will be noted that the portions of the panels 13 at the front sides of the respective axes 22 of pivotal movement of the panels 13 swing inwardly and the portions at the rear sides of the respective axes swing outwardly. Thus, the lips 56 on the strips 47 at the front sides of the respective axes 22 are positioned to engage the outer sides of the panels 13 when the latter are swung to their closed positions, and the lips 56 on the strip 47 at the rear sides of the respective axes 22 are located to engage the inner sides of the panels 13 when the latter are swung about pivots 22' to their closed positions. Since the rear edges of the ventilator panels 13 swing outwardly, the lips 56 on the strips 49 are also located to engage the inner sides of the panels 13 when the latter are swung to their closed positions. The relatively flexible weathersealing lips 57 alternate with the lips 56.

It is apparent from the above that the frame 11, main window panel 12, ventilator panels 13, and weatherstrips form a bench assembly capable of being installed as a unit on the vehicle body. The weatherstripping is such that it not only provides an effective weatherseal between the frame 11 and body structure, but in addition, assures maintaining an effective seal around the main panel 12 and ventilator panels 13.

What I claim as my invention is:

1. A vehicle body window assembly comprising a frame defining a window opening and having a member extending along the bottom of the opening and a member extending along each side of the opening, a ventilator panel supported within the opening for swinging movement about an upwardly inclined axis, a weatherstrip having a first part extending around the bottom frame member and one of said side frame members at the outer side of the frame to provide a weatherseal between the latter frame members and adjacent body structure, and a second part extending along the bottom frame member and said one of said side frame members at the inner side of the frame, a second weatherstrip coextensive with the second part aforesaid of the first weatherstrip and having portions engageable with the adjacent edges of the ventilator panel in the closed position of the latter to provide a weatherseal, and an interlocking connection between the second weatherstrip and the second part aforesaid of the first weatherstrip.

2. A vehicle body window assembly comprising a frame defining a window opening and having a member extending along the bottom of the window opening and a member extending along each side of said opening, flanges respectively extending laterally from the bottom frame member and one of said side frame members, a ventilator window supported within the window opening for swinging movement about an upwardly extending axis, a first weatherstrip comprising a body having inner and outer parts overlying one another and separable to receive the flanges aforesaid therebetween, a second weatherstrip coextensive with the first weatherstrip and having a weather tight connection with the inner part of the first weatherstrip, and lips on the second weatherstrip engageable with the adjacent sides of the ventilator window in the closed position of the latter to provide a weatherseal.

3. The assembly defined in claim 2 wherein the outer part of the first weatherstrip is engageable with adjacent supporting structure to provide a weatherseal and wherein the body of the first weatherstrip has a lip overlying one side of the body to form with the latter side a slot for receiving a portion of the supporting structure.

4. The assembly defined in claim 2 wherein the connection between the weatherstrips comprises a rib projecting outwardly from the second weatherstrip and having an interlocking connection with a groove in the adjacent surface of the inner part of the first weatherstrip.

5. A vehicle body window assembly comprising a frame defining a window opening and having a member extending along each side of the opening, a flange projecting laterally from a side of one of the frame members, a ventilator window supported within the window opening for swinging movement about an upwardly extending axis, a first weatherstrip comprising a body having inner and outer parts overlying one another and separable to receive the flange therebetween, a second weatherstrip coextensive with the first weatherstrip and having a lip engageable with the ventilator window in the closed position of the latter to provide a weatherseal, and cooperating interengaging means on the weatherstrips for securing the latter together in weathersealing relationship.

6. The assembly defined in claim 5 wherein the body of the first weatherstrip has a lip overlying one side of said body to form with the latter a slot to receive adjacent supporting structure for the frame.

7. A vehicle body window assembly comprising a frame defining a main window opening, said frame having a top bar, a bottom bar, and end bars respectively connecting opposite ends of the top bar to corresponding ends of the bottom bar, division members respectively connecting opposite ends of the top bar to the bottom bar at points spaced from the ends of the bottom bar to divide said main window opening into a center opening and ventilator window openings at opposite ends of the center opening, said frame bars having laterally projecting portions cooperating to provide an attaching flange extending around the frame, weatherstrips extending respectively along the top and bottom frame bars between the division members, said weatherstrips comprising body portions having inner and outer overlying parts separable to receive the adjacent portions of the flange therebetween, the outer parts being engageable with adjacent supporting structur and the inner parts having inwardly projecting lips spaced laterally from one another to provide a window retaining channel, and weatherstripping carried by the division members and having inwardly projecting lips cooperating to provide a retaining channel forming continuations of the retaining channels formed by the lips on the top and bottom weatherstrips aforesaid, a window for said center opening having marginal edges respectively engageable within said retaining channels, ventilator panels respectively supported on the frame within the ventilator window openings for swinging movement about an upwardly extending axis, weatherstripping for the ventilator panels forming a continuation of the top and bottom weatherstrips aforesaid, said last named weatherstripping comprising lengths of weatherstrip respectively extending along the bottom of the ventilator window openings and lengths of weatherstrip extending along the end bars of the frame, said lengths of weatherstrip having body portions respectively forming continuations of the body portions of the top and bottom weatherstrips aforesaid, said body portions of the lengths of weatherstrip having inner and outer overlying parts separable to receive the adjacent portions of the flange aforesaid on the frame, the outer parts of the lengths of weatherstrip forming continuations of each other and of the outer parts aforesaid of the top and bottom weatherstrip and engageable with the adjacent frame supporting structure, and weather sealing means on the inner parts of said lengths of weatherstrip engageable with the ventilator panels.

8. The assembly defined in claim 7, wherein said weather sealing means comprise strips having a weather sealing connection with the lengths of weatherstrip and having lips respectively engageable with the ventilator panels in the closed positions of the latter.

9. A vehicle body window assembly comprising a frame defining a window opening and having a member extending along each side of the opening, a flange projecting laterally from one side of each said frame members, a first weather strip comprising a body having inner and outer parts overlying one another and separable to receive the flanges therebetween, a portion of the inner part of said first weatherstrip having laterally spaced lips cooperating to form a glass retaining channel, a ventilator window supported within the window opening for swinging movement about an upwardly extending axis, another portion of the inner part of said first weatherstrip having therein a channel coextensive with the lower edge of said ventilator window, a second weatherstrip overlying said another portion, said second weatherstrip being coextensive with said last-mentioned channel and having means thereon interengaging said last-mentioned channel for securing the weatherstrips together in weathersealing relationship, said second weatherstrip having a lip engageable with the ventilator window in the closed position of the latter to provide a window seal.

10. The assembly defined in claim 9 wherein the body portion of the first weatherstrip has a lip overlying one side of said body portion to form with the latter a continuous slot to receive adjacent supporting structure for the frame.

References Cited in the file of this patent

UNITED STATES PATENTS

| | | |
|---|---|---|
| D. 162,136 | Earl | Feb. 27, 1951 |
| 1,646,743 | Bernard | Oct. 25, 1927 |
| 2,258,996 | Morrison | Oct. 14, 1941 |
| 2,547,799 | Wernig | Apr. 3, 1951 |
| 2,587,288 | Chapman | Feb. 26, 1952 |
| 2,606,635 | Clingman | Aug. 12, 1952 |
| 2,693,009 | Beck | Nov. 2, 1954 |